Nov. 29, 1966 N. D. HAZZARD 3,287,819
WASTE DISPOSAL SYSTEM
Filed April 23, 1964
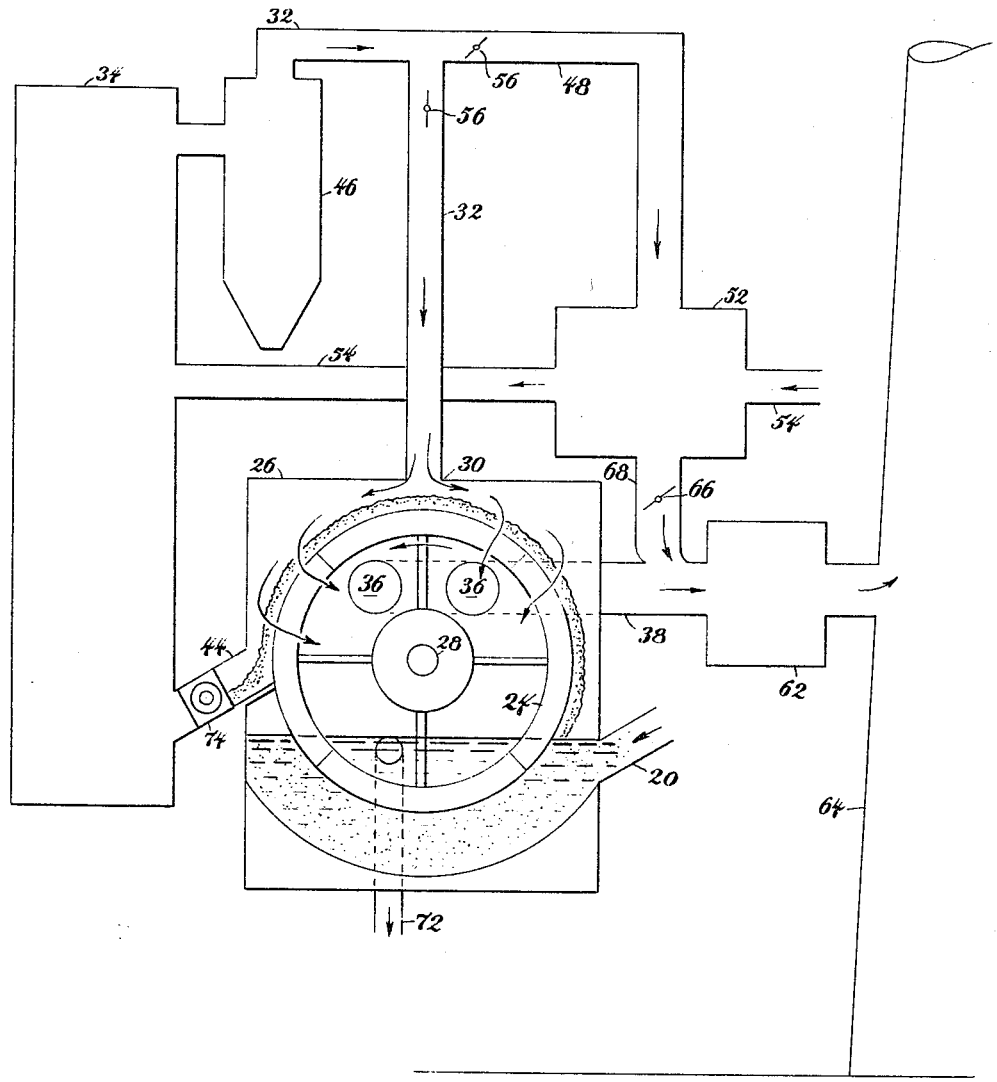
INVENTOR
Noel D. Hazzard
By Wayne Lang
AGENT

United States Patent Office 3,287,819
Patented Nov. 29, 1966

3,287,819
WASTE DISPOSAL SYSTEM
Noel D. Hazzard, Andover, N.Y., assignor, by mesne assignments, to The Air Preheater Company, Inc., a corporation of Delaware
Filed Apr. 23, 1964, Ser. No. 362,095
6 Claims. (Cl. 34—58)

This application relates to the disposal of organic sludges of the type that commonly occurs as a waste product in various industries and in the disposal of sewage. More particularly it relates to a method and apparatus for effectively treating such sludges in order that they may be readily and effectively disposed of by a process of combustion.

The recent increase in air and water borne pollution accompanying the increased concentration of population and industry has resulted in an urgent demand for improved methods of waste disposal in order that waste products will not be permitted to pollute the atmosphere or water. Thus, not only must a waste product be removed from its primary carrying medium, but it must be further reduced to a completely innocuous state in order that it may be safe for ultimate disposal.

Combustion of industrial and sewage sludges has been an accepted method of disposal for some time. However, apparatus utilizing this process is expensive and the process itself is difficult to maintain. Thus the combustion of industrial and sewage sludge has heretofore been limited to a few applications that defy disposal by more conventional and economical methods.

One of the chief difficulties encountered in the combustion of sludge is the usually high moisture content of the bulk sludge when it is presented for combustion. Thus an important consideration in the preparation of sludge for combustion and an impotrant object of this invention is to provide a method and arrangement for effectively minimizing the moisture content in a supply of sludge that is being supplied to a reactor whereby it will readily support combustion.

It is a further object of this invention to provide an economical system of sludge disposal by autogenous combustion, and it is a still further object of the invention to provide a system which utilizes the heat of burning sludge and then removes all particulate matter from gases exhausting therefrom in an efficient and economic manner.

These and other objects of my invention will be more apparent when considered in conjunction with the accompanying drawing in which the single figure is a schematic diagram of the basic arrangement that comprises the invention.

The drawing illustrates a system in which a quantity of sludge or waste entrained slurry is continuously supplied through an inlet duct 20 to a rotary type filter-dryer having a cylindrical drum type filter 24 in the housing 26. The drum 24 is moved continuously about its axis 28 by drive means not here illustrated. The level of the slurry maintained in the housing 26 is such that it submerges only the lower portion of the filter 24. As the drum filter rotates through the slurry it becomes coated with a layer of the slurry which is carried with the drum 24 to the upper portion of the housing 26 and over to the outlet duct 44 for removal from the filter.

An inlet 30 opening into the housing admits hot exhaust gases from duct 32 which originate in a reactor 34. The hot gases which enter the housing 26 are supplied thereto under a slight positive pressure sufficient to force them through the filter drum and its coating of slurry to outlet openings 36 which lead to outlet duct 38.

As the hot gases from reactor 34 pass through the coating of slurry on the filter drum 24, the moisture in the wet slurry is evaporated and the temperature of the dried sludge is raised before it is scraped off the drum and returned via duct 44 to the reactor 34 where it is then subjected to conditions that support its combustion.

As the liquid in the slurry is being removed therefrom by the action of the perforate filter drum 24, the filtered solids on the drum 24 simultaneously serve as a continuously renewable filter bed that removes particulate matter from the gases exhausting from reactor 34 before the gas is exhausted to the atmosphere through duct 38 and stack 64. If excessive amounts of particulate material are given off by the combustion process in the reactor, it may be desirable to utilize an additional gas cleaning apparatus 46 in advance of the filter-dryer to remove the bulk of the large particles from the exhaust gas in order that the particle buildup of the drum 24 will not be excessive and thus interfere with the drying of solids in the slurry.

In the event that gas being exhausted from the reactor 34 is in excess of that required to satisfactorily dry the slurry being supplied by the filter-dryer to the reactor, the excess exhaust gases may be directed through branch duct 48 and a heat exchanger 52 where such exhaust gases will give up their heat to air for combustion being supplied to the reactor 34 through duct 54.

Fluid flow through ducts 32 and 48 may be proportioned in accordance with the demands of the system by means of the damper valves 56.

Hot exhaust gas which has traversed the filter-dryer 20 and/or the heat exchanger 52 is preferably directed through a scrubber 62 before it is exhausted to the atmosphere through a stack 64. Valve means 66 in duct 68 that connects the heat exchanger to exhaust duct 38 is adapted to preclude back flow through the heat exchanger due to any variations in pressure.

Filtered liquid that collects inside the drum 24 of the filter-dryer is drawn off through an outlet pipe 72 and discarded through any suitably disposed drain or it is otherwise utilized as deemed appropriate.

Dried waste products are scraped off the rotary drum 24 and are directed through outlet duct 44 and a positive feeding apparatus 74 to the reactor 34. The form of the feeding apparatus 74 may vary from system to system inasmuch as variable factors such as the physical consistency of the solids, quantity of solids, distance of the filter from the reactor and their relative position are all factors that influence the final selection.

The invention has been thus described with reference to the embodiment illustrated in the drawing although it is evident that various changes may be made without departing from the spirit of the invention. It is accordingly intended that all matter contained in the accompanying drawings and shown in the above description shall be interpreted as illustrative and not in a limiting sense.

I claim:
1. A waste disposal system comprising in combination a continuous filter having an inlet for waste entrained slurry and an outlet for the removal of filtered waste therefrom, a reactor for the combustion of said filtered waste, means conveying filtered waste from said filter to said reactor, means forming part of said filter operative to continuously form a layer of slurry, means directing hot gases exhausting from the reactor to and through said layer thereby removing entrained particles from said gases while the filtered waste is being heated by said hot gases before it is conveyed to the reactor, gas cleaning means, and means directing gases after traversal of said layer of slurry to said gas cleaning means.
2. A waste disposal system for the disposal of organic waste in a waste entrained slurry comprising a housing having an inlet for said slurry and an outlet for the removal of filtered waste therefrom, a cylindrical drum type filter in said housing mounted for rotation about a horizontal axis to permit the lower portion of said filter to be submerged in said slurry and coated therewith as it is rotated therethrough, a reactor for the combustion of waste exhausted from said filter, means for conveying the waste from said filter to said reactor, duct means connecting said reactor to said filter housing to permit the flow of exhaust gases thereto, and an outlet duct for clean cooled gas connected to the interior of said cylindrical filter whereby hot gas exhausting from the reactor is directed through the filter and its coating of waste before being exhausted through said outlet duct to simultaneously dry the waste on said filter and remove particulate matter from the exhaust gas.

3. A system for the disposal of organic waste products carried by a waste entrained slurry comprising a housing having an inlet for said slurry and an outlet for the removal of organic solids therefrom, a cylindrical filter in said housing mounted for rotation about a horizontal axis, a reactor for the combustion of waste material exhausted from said filter, means for conveying the waste material from said filter to said reactor, an exhaust duct connecting said reactor to said filter housing to permit the flow of the gaseous products of combustion from the reactor into the filter housing, an outlet duct for clean cooled gas exhausting from the interior of the cylindrical filter whereby gas exhausting from said reactor traverses said filter before being exhausted through said outlet duct, and duct means for exhausting filtered liquid from the interior of said cylindrical filter, said duct means having an inlet thereto submerged in filtered liquid to preclude the entrance of filtered combustion gas.

4. A system for the disposal of organic waste products as defined in claim 3 having dust collecting means in said exhaust duct and gas cleaning means in said outlet duct to supplement the cleaning action of said filter.

5. A system for the disposal of organic waste products as defined in claim 3 including duct means for combustion air connected to the reactor, and means for subjecting the combustion air in said duct means to heat of the gases exhausting from the reactor.

6. A waste disposal system for the disposal of organic waste in a waste entrained slurry comprising a housing having an inlet for said slurry and an outlet for the removal of filtered waste therefrom, a cylindrical drum type filter in said housing mounted for rotation about a horizontal axis to permit the lower portion of said filter to be submerged in said slurry and coated therewith as it is rotated therethrough, a reactor for the combustion of waste exhausted from said filter, means for supplying combustion supporting air to said reactor including an air heater to heat the same, means for conveying the waste from said filter to said reactor, duct means connecting said reactor to said filter housing to permit the flow of exhaust gases thereto, additional duct means conveying a portion of said exhaust gases to said air heater, and an outlet duct for clean cooled gas connected to the interior of said cylindrical filter whereby hot gas exhausting from the reactor is directed through the filter and its coating of waste before being exhausted through said outlet duct to simultaneously dry the waste on said filter and remove particulate matter from the exhaust gas.

References Cited by the Examiner
UNITED STATES PATENTS

| | | | |
|---|---|---|---|
| 1,967,197 | 7/1934 | Besselievre | 210—152 X |
| 2,282,370 | 5/1942 | McConechy | 110—8 |

FREDERICK L. MATTESON, Jr., *Primary Examiner.*

JOHN J. CAMBY, *Examiner.*